United States Patent
Nakajima et al.

(10) Patent No.: US 9,025,975 B2
(45) Date of Patent: May 5, 2015

(54) SWITCHING POWER SOURCE AND IMAGE FORMING APPARATUS HAVING THE SAME

(75) Inventors: Yuki Nakajima, Numazu (JP); Fumiaki Mizuno, Suntou-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 163 days.

(21) Appl. No.: 13/164,516

(22) Filed: Jun. 20, 2011

(65) Prior Publication Data

US 2011/0311260 A1 Dec. 22, 2011

(30) Foreign Application Priority Data

Jun. 22, 2010 (JP) ................................. 2010-141937

(51) Int. Cl.
- *G03G 15/00* (2006.01)
- *H02M 3/335* (2006.01)
- *H02M 3/338* (2006.01)
- *H02M 1/00* (2006.01)

(52) U.S. Cl.
CPC ......... H02M 3/3385 (2013.01); *G03G 15/5004* (2013.01); *H02M 2001/0032* (2013.01); *Y02B 70/16* (2013.01)

(58) Field of Classification Search
CPC ......... Y02B 70/16; H02M 2001/0032; H02M 3/33507
USPC ......................................... 399/88; 363/21.12
See application file for complete search history.

(56) References Cited

U.S. PATENT DOCUMENTS

| | | | |
|---|---|---|---|
| 6,480,401 B2 | 11/2002 | Tang | |
| 2002/0131279 A1* | 9/2002 | Tang | 363/21.12 |
| 2003/0214820 A1* | 11/2003 | Nakata | 363/21.01 |
| 2004/0090805 A1* | 5/2004 | Kitano | 363/55 |
| 2006/0171179 A1* | 8/2006 | Hall et al. | 363/95 |
| 2008/0049457 A1* | 2/2008 | Choi et al. | 363/21.12 |
| 2010/0102642 A1* | 4/2010 | Odaohhara et al. | 307/125 |
| 2010/0149840 A1 | 6/2010 | Hayasaki | |

FOREIGN PATENT DOCUMENTS

| | | | |
|---|---|---|---|
| JP | 07-245942 A | | 9/1995 |
| JP | 07245942 A | * | 9/1995 |
| JP | 11215819 A | * | 8/1999 |
| JP | 2003-169467 A | | 6/2003 |
| JP | 2003-284340 A | | 10/2003 |
| JP | 2007-124886 A | | 5/2007 |
| JP | 2008-116491 A | | 5/2008 |
| KR | 10-2009-0013654 A | | 2/2009 |

OTHER PUBLICATIONS

Seokbung Han, "Design of AC_DC Converter Control IC with Standby Power Reduction Function"; Dept of Electronic Engineering Graduate School; Gyeongsang National University; Feb. 2009.

* cited by examiner

*Primary Examiner* — Clayton E Laballe
*Assistant Examiner* — Tyler Hardman
(74) *Attorney, Agent, or Firm* — Canon USA Inc. IP Division

(57) ABSTRACT

A switching power source is provided, which includes, a transformer, a switching unit configured to switch a voltage supplied to a primary side of the transformer, and an output unit configured to output a voltage generated at a secondary side of the transformer, wherein a switching cycle of the switching unit is set to be a predetermined period of time when the output unit outputs a first voltage, a first period of time and a second period of time are set to be longer than the predetermined period of time and are set to be different from each other.

8 Claims, 11 Drawing Sheets

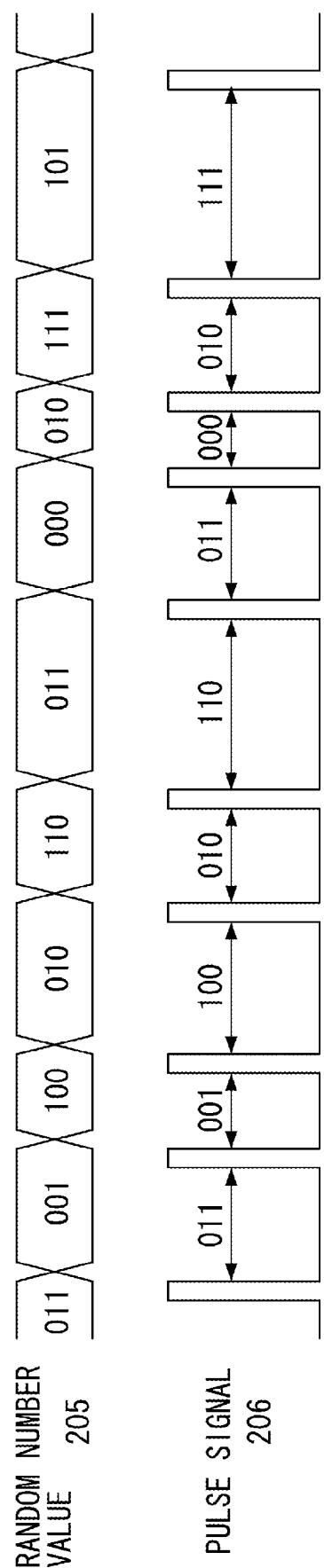

SWITCHING POWER SOURCE AND IMAGE FORMING APPARATUS HAVING THE SAME

BACKGROUND OF THE INVENTION

1. Field of the Invention

The present invention relates to a switching power source generating direct current voltage.

2. Description of the Related Art

Switching power source of self-excited oscillation type (hereinafter, referred to as switching power source) is known power source, which converts a direct current voltage into constant voltage appropriate to be used in apparatuses. In this case, the direct current voltage is acquired by rectification and smoothing of an alternating-current voltage input from commercial power source. The switching power source is typically designed to produce maximum efficiency when loaded to a highest level required for an electronic device having a power source. Thus, lighter load on the switching power sources (i.e., light loaded state) decreases efficiency of the switching power sources. Consequently, electronic devices equipped with self-oscillating switching power sources are configured to enter a sleep mode to reduce power consumption while the devices are not operated.

In the sleep mode, the switching power sources do not continuously oscillate, but intermittently oscillate by repeating oscillation and stopping the oscillation at predetermined intervals (hereinafter, referred to as intermittent oscillation operation) to prevent loss in efficiency of switching operations while reducing power consumption. The operation is controlled by transmitting a signal that instructs to stop oscillation, from a secondary side to a primary side of the switching power source, and switching the mode of the routine sequence to the intermittent oscillation operation mode. Such intermittent oscillation operation is discussed in Japanese Patent Application Laid-Open No. 2003-284340 for example. In the intermittent oscillation operation, a switching device (e.g., field effect transistor: MOSFET) in a switching power source is kept turned on for longer time than normal, reducing the number of switching operations, which prevents decrease in operation efficiency. The intermittent oscillation operation can be controlled, for example, by measuring time using a timer incorporated in a microcomputer, and intermittently oscillating at intervals appropriate for a constant of a power source circuit and for a load to be connected However, a problem described below occurs when the intermittent oscillation operation is performed. It was found that, in the intermittent oscillation operation, a noise is generated from a transformer. The noise has intensity peaks at a multiple of a frequency of which a cycle is interval between the oscillation operations. FIG. 9 is a graph illustrating an example of noise from a transformer, with the horizontal axis for frequency and the vertical axis for noise intensity, in the case where the intermittent oscillation operation is performed at a frequency of 10 KHz. FIG. 9 indicates the transformer generates noise showing the frequency characteristics in which the intensity peaks of the noise are distributed discretely. Such noise showing the frequency characteristics results from a frequency of noise generated by mechanical vibration of the transformer combined with high frequency components of the drive frequency of a switching device. A range of such noise is also known to be within human audibility, and is an unpleasant noise to human ears. In other words, during the intermittent oscillation operation, power consumption can be reduced without decreasing efficiency of switching power source, but electronic devices incorporated in the switching power source generate the unpleasant noise.

SUMMARY OF THE INVENTION

The invention of this application enables reduction of unpleasant noise generated by a transformer during intermittent oscillation operation of a switching power source.

According to an aspect of the present invention, a switching power source is provided, which includes: a transformer; a switching unit configured to switch a voltage supplied to a primary side of the transformer; and an output unit configured to output a voltage generated at a secondary side of the transformer, wherein a switching cycle of the switching unit is set to be a predetermined cycle when the output unit outputs a first voltage, a first period of time and a second period of time of the switching cycle are set to be longer than the predetermined cycle and are set to be different from each other.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 3 illustrates the relationship between random values from an oscillation stop signal generation unit and waveforms of oscillation stop signals according to the first exemplary embodiment.

DESCRIPTION OF THE EMBODIMENTS

Various exemplary embodiments, features, and aspects of the invention will be described in detail below with reference to the drawings.

A switching power source of self-excited oscillation type (hereinafter, referred to as switching power source) of a first exemplary embodiment is characterized in that intervals of intermittent oscillation operation are randomly changed for every oscillation, so that no sound is generated from a transformer, the sound showing frequency characteristics that distribute intensity peaks of the noise at definite frequencies.

Figure 1:
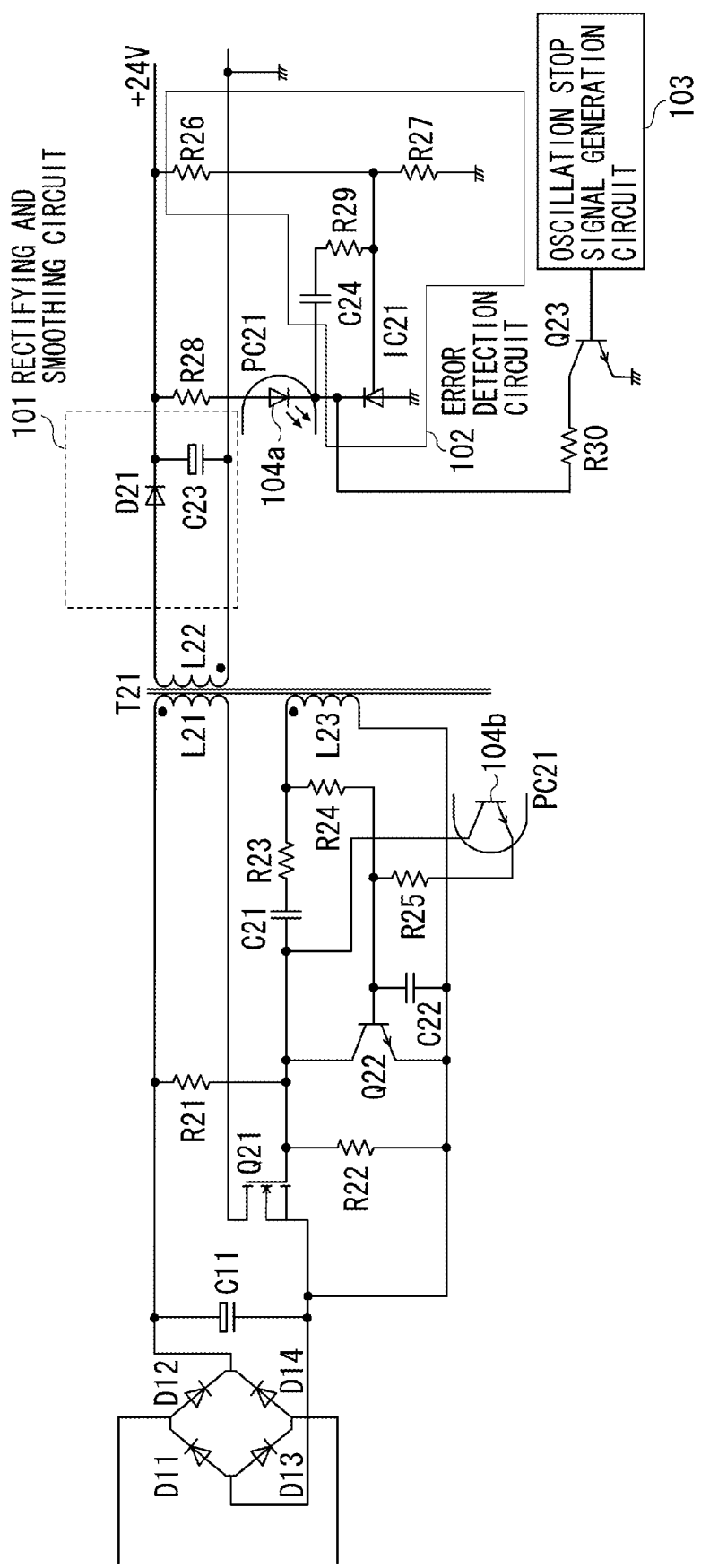
FIG. 1 illustrates a circuit of a switching power source according to a first exemplary embodiment.

The first exemplary embodiment is described. FIG. 1 illustrates a circuit configuration of a switching power source according to the first exemplary embodiment. The circuit configuration of the switching power source according to the present exemplary embodiment includes an isolation transformer T21 having a primary winding L21, a secondary winding L22, and a feedback winding L23, and a diode bridge having diodes D11, D12, D13, and D14 as rectifying devices. The circuit configuration further includes a smoothing capacitor C11, a starting resistor R21, a resistor R24, a switching device Q21 having a control terminal, a switching device Q22 having a control terminal, and a switching device Q23 having a control terminal. The circuit configuration further includes a photo coupler PC21 having a light emitting diode 104a (on the secondary side) and a phototransistor 104b (on the primary side), a rectifying and smoothing circuit 101 having a diode D21 and a capacitor C23, an error detection circuit 102 having resistors R26, R27, and R29, a capacitor C24, and a shunt regulator IC21, and an oscillation stop signal generation circuit 103. In the present exemplary embodiment, the switching device Q21 is a metal-oxide-semiconductor field-effect transistor (MOSFET), and the devices Q22 and Q23 are transistors.

Connections between the elements in the circuit of the switching power source are described. The primary winding L21 of the isolation transformer T21 is connected, at its negative end, to a current inflow terminal of the switching device Q21, and is connected, at its positive end, to one end of the starting resistor R21. The other end of the starting resistor R21 is connected to the control terminal of the switching device Q21, one end of a series circuit having the capacitor C21 and the resistor R23, one end of the resistor R22, a current inflow end of the switching device Q22, and the phototransistor current inflow side of a series circuit having the phototransistor 104b of the photo coupler PC21 and a resistor R25.

The other end of the resistor R22 is connected to the current outflow ends of the switching device Q21 and the switching device Q22, one end of the capacitor C22, and the negative electrode side of the feedback winding L23 of the isolation transformer T21. The other end of the series circuit having the capacitor C21 and the resistor R23 is connected to the positive electrode side of the feedback winding L23 of the isolation transformer T21, and one end of the resistor R24. The other end of the resistor R24 is connected to the control terminal of the switching device Q22, the other end of the capacitor C22, and the phototransistor current outflow end of the series circuit having the phototransistor 104b of the photo coupler PC21 and the resistor R25.

The rectifying and smoothing circuit 101 is connected to the secondary winding L22 of the isolation transformer T21 such that a current flows into the secondary winding L22 while the switching device Q21 is turned off. The error detection circuit 102 compares an output voltage of the rectifying and smoothing circuit 101 to a reference voltage and outputs a voltage corresponding to a difference between the voltages. The error detection circuit 102 is, at its output, connected to the cathode side of the light emitting diode 104a of the photo coupler PC21 and the current inflow terminal of the switching device Q23 through a resistor 30. The switching device Q23 has a current outflow terminal connected to the low-voltage side output of the rectifying and smoothing circuit 101. The control terminal of the switching device Q23 is connected to an output of the oscillation stop signal generation circuit 103.

Functions of the elements in the circuit of the switching power source are described. The diode bridge including the diodes D11, D12, D13, and D14 performs full-wave rectification of the alternating voltage supplied from commercial power sources. The smoothing capacitor C11 smoothes the voltages after the full-wave rectification by the diode bridge to generate direct voltage. The isolation transformer T21 includes the primary winding L21, the secondary winding L22, and the feedback winding L23. The switching device Q21, which is an MOSFET in the present exemplary embodiment, includes a control terminal that controls conduction/non-conduction (hereinafter, referred to as on and off) of a current flowing through the primary winding L21 of the isolation transformer T21. The control terminal turns on and off the switching device Q21 to intermittently cause a current to flow through the primary winding L21 of the isolation transformer T21. The rectifying and smoothing circuit 101 includes a diode D21 and a capacitor C23, and smoothes and rectifies a voltage across the secondary winding L22 of the isolation transformer T21 while the switching device Q21 is OFF, to generate a DC voltage.

The error detection circuit 102 inputs a voltage to a reference terminal of the shunt regulator IC21, in which an output voltage from the rectifying and smoothing circuit 101 is divided by the resistors R26 and R27. The shunt regulator IC21 which has a reference voltage inside is a device that compares the reference voltage with a voltage which is input to the reference terminal and generates a voltage corresponding to the difference between the compared voltages at its cathode terminal. The error detection circuit 102 includes a circuit composed of the capacitor C24 and a resistor R29, in which the circuit is used for phase compensation. The photo coupler PC21 includes the light emitting diode 104a disposed on the secondary side and the phototransistor 104b disposed on the primary side of the isolation transformer T21. The photo coupler PC21 serves as a signal transfer unit configured to transfer outputs from the secondary to the primary. A current corresponding to the cathode voltage from the shunt regulator IC21 flows through the light emitting diode 104a of the photo coupler PC21 to emit light, which is received by the phototransistor 104b and is transferred as a current.

The switching device Q21 is turned on, at the time of power-on, when a current from the starting resistor R21 charges the capacitor C21 and the voltage across the control terminal of the switching device Q21 rises. The switching device Q21 is turned on, during continuous oscillation, when a voltage is generated across the feedback winding L23 of the isolation transformer T21 (which is also called ringing). The ringing occurs when the energy stored in the isolation transformer T21 is completely released to the secondary side through the secondary winding L22. The switching device Q21 is turned off when the switching device Q22 is turned on and the voltage across the control terminal of the switching device Q21 drops. The control terminal of the switching device Q22 is provided with a capacitor C22, and the capacitor C22 is charged through the resistor R24 when the switching device Q21 is turned on and the voltage across the feedback winding L23 of the isolation transformer T21 rises. The resistor R24 determines a minimum oscillation frequency of the switching power source. A current through the control terminal of the switching device Q21 flows into and charges the phototransistor 104b of the photo coupler PC21.

The ON time of the switching device Q21 depends on a charging rate of the capacitor C22. This is because the switching device Q22 is turned on and the switching device Q21 is turned off when the voltage across the capacitor C22 exceeds a threshold voltage across the control terminal of the switching device Q22. The capacitor C22 is charged by the sum of the current from the resistor R24 and the current from the phototransistor 104b of the photo coupler PC21. The current from the phototransistor 104b of the photo coupler PC21 changes depending on an output voltage across the error detection circuit 102 on the secondary side.

The output from the error detection circuit 102 decreases when output voltage from the secondary side becomes higher, and increases when output voltage from the secondary side becomes lower. Accordingly, the current from the phototransistor 104b of the photo coupler PC21 is larger when output voltage from the secondary side becomes higher, and is smaller when output voltage from the secondary side becomes lower. In other words, the photo coupler PC21 is turned on for a shorter period of time when an output voltage from the secondary side becomes higher, and for a longer period of time when an output voltage from the secondary side becomes lower. A maximum period of ON time of the switching power source in the present exemplary embodiment is determined by the resistor R24 and the capacitor C21. If a resistor is arranged in parallel to the capacitor C21, the ON time is affected by the resistor.

Herein, when an electronic device having the switching power source operates under heavy load (e.g., in a normal mode of the electronic device), the oscillation stop signal generation circuit 103 sets the control terminal of the switching device Q23 to a LOW-level output state. Accordingly, the switching power source performs the continuous oscillation operation as described above. In contrast, when the device is in a sleep mode under light load (e.g., in a power saving mode or light load mode of the electronic device), the oscillation stop signal generation circuit 103 repeatedly outputs HI/LOW pulse signals to the control terminal of the switching device Q23. Specifically, the oscillation stop signal generation circuit 103 intermittently applies pulse signals to the control terminal of the switching device Q23, so that the switching device Q23 is switched between an intermittent ON/OFF mode and a stationary off mode. This enables the switching power source to perform intermittent oscillation operation.

While the control terminal of the switching device Q23 is set to be in HI state, a current that is limited by the resistor R28 independently of output from the error detection circuit 102 flows through the light emitting diode 104a on the secondary side of the photo coupler PC21. The current is sufficiently larger than that in normal continuous oscillation mode, and hence upon arriving at the light emitting diode 104b on the primary side of the photo coupler PC21, the current causes the voltage across the capacitor C22 to rise instaneously. This turns on the switching device Q22, and turns off the switching device Q21. When this state continues for a period two to twenty times as long as the oscillation frequency of the switching power source, the energy of the isolation transformer T21 is released, and the primary side of the switching power source enters the same mode as that before operation.

In contrast, the secondary side of the switching power source generates output with a small load for a short period of time, and hence the output voltage can be generally maintained as it is without change. As soon as the control terminal of the switching device Q23 is returned to LOW state from HI state, the current through the light emitting diode 104a on the secondary side of the photo coupler PC21 returns to its original state, so that the current through the photo transistor 104b on the secondary side of the photo coupler PC21 returns approximately to its original state. In the case where a voltage drop across the phototransistor 104b caused by a current owing to the resistor R24 is set larger than a threshold voltage of the switching device Q22, the switching device Q22 remains turned ON, and the current through the starting resistor R21 entirely flows into the switching device Q22. Accordingly, the switching device Q21 is not turned on, and the switching power source is maintained in a stopped state.

According to time elapsed, the electrical charges stored within the capacitor C23 of the rectifying and smoothing circuit 101 is used by load, and the output voltage on the secondary side gradually decreases. As a result, the output voltage of the error detection circuit 102 increases and the current through the phototransistor 104b on the primary side of the photo coupler decreases. When a voltage drop across the resistor R24 by the current is set smaller than the threshold voltage of the switching device Q22, the capacitor C21 is charged through the starting resistor R21, the switching device Q21 is turned on, and the switching power source initiates oscillation. The switching power source initiates oscillation when the current through the resistor R24, which is the output voltage of the error detection circuit 102, in other words the output voltage on the secondary side, reaches a predetermined value, as described above. Accordingly, in the mode where pulses are applied to the switching device Q23, the minimum voltage while the oscillation of output voltage on the secondary side is stopped can be set by the resistor R24 independently of the state of the applied pulses. The setting of the minimum voltage is described.

The following equations are provided, where "if" represents current through the phototransistor 104b of the photo coupler PC21, vf represents cathode voltage of the shunt regulator IC21, vo is output voltage on the secondary side, Vr represents reference voltage of the shunt regulator IC21, vc represents voltage across capacitor C24, and "a" represents current transfer ratio of the photo coupler PC21: IF, Vr, Vo, and Vc respectively represent if, vf, vo, and vc for a steady state in which load current is Io. In the equations, uppercase alphabetic characters are constants, and lowercase alphabetic characters are variables.

$$vf = Vr + Vc + b(Vr - cvo) \qquad \text{Equation 1}$$

$$if = a(vo - vf)/R28 \qquad \text{Equation 2}$$

$$Vf = Vr + Vc \qquad \text{Equation 3}$$

$$Vr = cVo \qquad \text{Equation 4}$$

$$If = a(Vo - Vf)/R28 \qquad \text{Equation 5}$$

In the Equation 1 for a cathode voltage vf of the shunt regulator IC21, the constant b represents the amplification factor of an inverting amplifier composed of the combined resistance of the resistors R26 and R27, the resistor R29, and the shunt regulator IC21. The constant c represents the voltage ratio between the resistors R26 and R27. Equation 1 gives a cathode voltage vf relative to a small change in vo of the shunt regulator IC21, and the voltage across the capacitor C24 is considered to be a fixed value, so that the voltage is denoted by Vc. Equation 2 gives the relationship between the cathode voltage of the shunt regulator IC21 and the current through the phototransistor 104b of the photo coupler PC21. Equation 2 is based on the assumption that there is no voltage drop across the light emitting diode 104a of the photo coupler PC21. Equation 3 gives a cathode voltage of the shunt regulator IC21 in its steady state, and Equation 4 gives a reference voltage of the shunt regulator. Equation 5 gives the relationship between the cathode voltage of the shunt regulator IC21 in its steady state and the current through the phototransistor 104b of the photo coupler PC21. Form these equations, the following relational expression can be derived.

$$if = If - a(1/c + b)(Vr - cvo)/R28 \qquad \text{Equation 6}$$

In Equation 6, the constants Vr, b, and c can be considered as fixed values. The current If through the phototransistor 104b in its steady state is determined by the load current through the switching power source. The current If is considered to change within an extremely small range while an operation is assumed to be limited to light load.

According to Equation 6, the relationship between the current If through the phototransistor 104b of the photo coupler PC21 and the output voltage vo on the secondary side depends on the current transfer ratio "a" of the photo coupler PC21. The switching power source turns from the oscillation stopped state to the oscillation initiated state, when the current if through the phototransistor 104b of the photo coupler PC21 has reached a predetermined value. Hence, the minimum output voltage on the secondary side while the oscillation is stopped is steady depending on the current transfer ratio "a" of the photo coupler PC21. In other words, if the current transfer ratio "a" of the photo coupler PC21 changes only within an extremely small range, the minimum output voltage on the secondary side when the oscillation is stopped can be made approximately steady independently of pulse waveform and load.

The above setting condition of the minimum output voltage in the present exemplary embodiment is an illustrative example, and the circuit configuration may further include capacitors and resistors to prevent malfunction by removal of noise.

Figure 2:
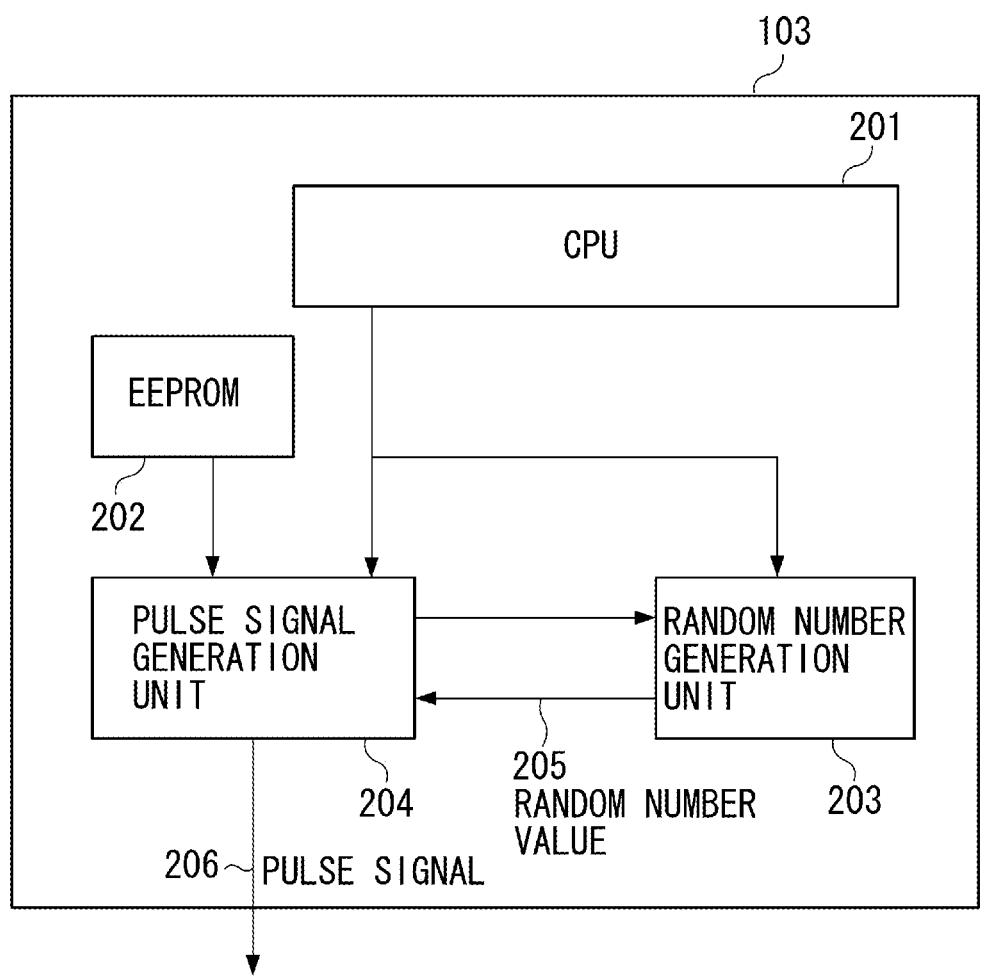
FIG. 2 illustrates a configuration of a self-excited oscillation stop signal generation unit of a switching power source according to the first exemplary embodiment.

FIG. 2 illustrates a configuration of the oscillation stop signal generation circuit 103. The oscillation stop signal generation circuit 103 includes a central processing unit (CPU) 201, an electrically erasable programmable read only memory (EEPROM) 202 as nonvolatile memory, a random number generation unit 203, and a pulse signal generation unit 204. These elements are described.

The CPU 201 controls operations of the random number generation unit 203 and the pulse signal generation unit 204. The EEPROM 202 stores information of the period for stopping oscillation in the power source circuit of the switching power source and the optimal period for oscillation. The period for stopping oscillation starts, in intermittent oscillation operation, when the circuit stops oscillation in response to an instruction from the control terminal Q23 and ends when the circuit resumes the oscillation. The optimal period for oscillation falls on the period of time when the oscillation is most efficiently performed during intermittent oscillation operation, within the period after oscillation is resumed until the oscillation is stopped in response to an instruction from the control terminal. These two periods are calculated and set using the circuit constant on the secondary side of the power source circuit and the magnitude of the load to be connected. In the present exemplary embodiment, the period for stopping oscillation and the optimal period for oscillation are calculated in advance to be stored in the EEPROM 202.

The random number generation unit 203 generates a pseudo-random number using its internal circuit when receiving a signal that instructs the random number generation from the pulse signal generation unit 204, and transmits the generated random number to the pulse signal generation unit 204. In the present exemplary embodiment, pseudo-random numbers are used, which are generated by sequentially and continuously outputting a numerical sequence composed of about 100 random numbers. The pseudo-random numbers can be generated, alternatively, by storing a random-number table in storage area and generating pseudo-random number in sequence with reference to the table.

The pulse signal generation unit 204 receives information of the period for stopping oscillation and the optimal period for oscillation stored in the EEPROM 201 and the random numbers transmitted from the random number generation unit 203, and determines a pulse interval for every pulse. A pulse width is set to range two to about 20 times that of the oscillation frequency of the switching power source. The pulse width in the present exemplary embodiment is set to be in range about 10 times that of the oscillation frequency of the switching power source. The pulse interval is set by adding a random value as difference value to a reference value that is the sum of the period for stopping oscillation and the optimal period for oscillation. The difference value is added to the reference value after correcting the random value to be within about 10% of the reference value. If the pulse interval is shorter than the period while the oscillation is stopped, the oscillation frequency cannot be controlled easily as desired in the intermittent oscillation operation. Hence, the difference value is adjusted so that the pulse interval is prolonged to exceed the period in which the oscillation is stopped. After the adjustment, the pulse signal generation unit 204 transmits a pulse to the control terminal Q23, and also transmits a signal that instructs generation of a random number to the random number generation unit 203 to receive a next random value. The operation is repeated every time a pulse is transmitted.

FIG. 3 illustrates the relationship, during repetition of the above serial operations, between pulse waveforms output from the oscillation stop signal generation circuit 103 and the random value in the oscillation stop signal generation circuit 103 outputting pulse waveforms. In the present exemplary embodiment, each random number has three bits, but number of bits is not limited to three bits and can produce similar effects even if the number of bits is changed. The circuit determines a next pulse interval according to the generated random number, and outputs a pulse. Every time a pulse is output, a next random number having a different value from that of a previous number is output to be used to determine the next pulse interval. As a result, pulse intervals are changed for every pulse.

In the present exemplary embodiment, the random number generation unit 203 and the pulse signal generation unit 204 are included in the oscillation stop signal generation circuit 103, separated from the CPU 201. Alternatively, the operations of the random number generation unit 203 and the pulse signal generation unit 204 may be executed by the CPU 201 according to a program code read from a storage medium.

Figure 4A:
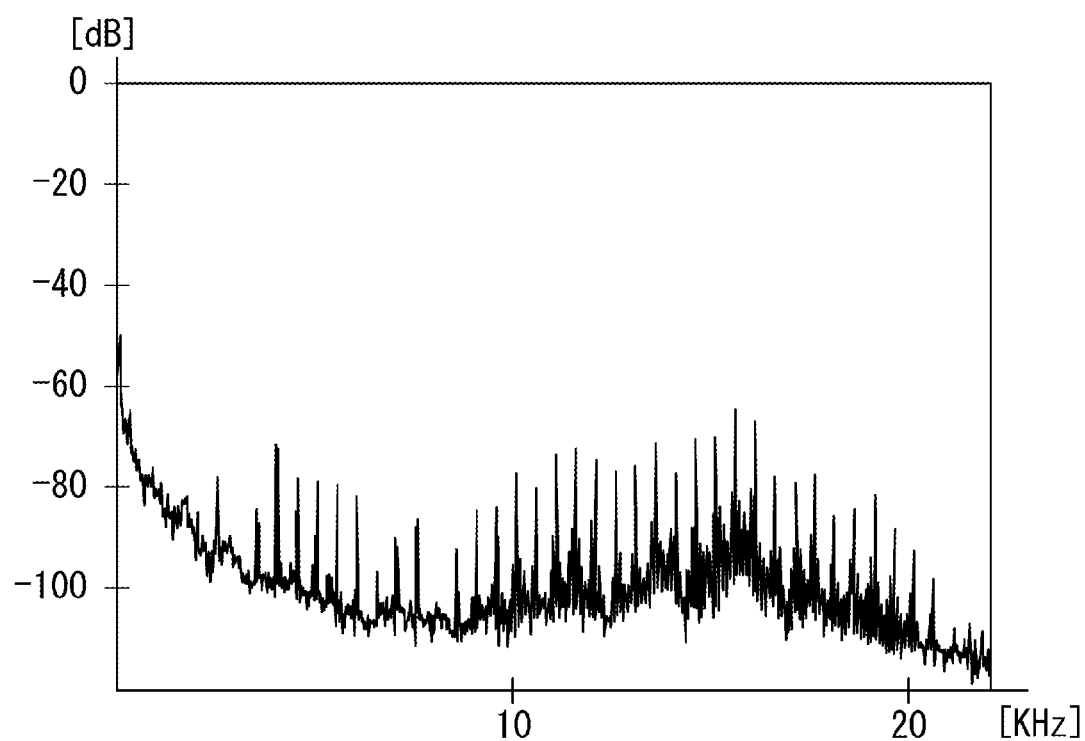
FIGS. 4A and 4B illustrate frequency characteristics of noise generated by an isolation transformer of the first exemplary embodiment.
Figure 4B:
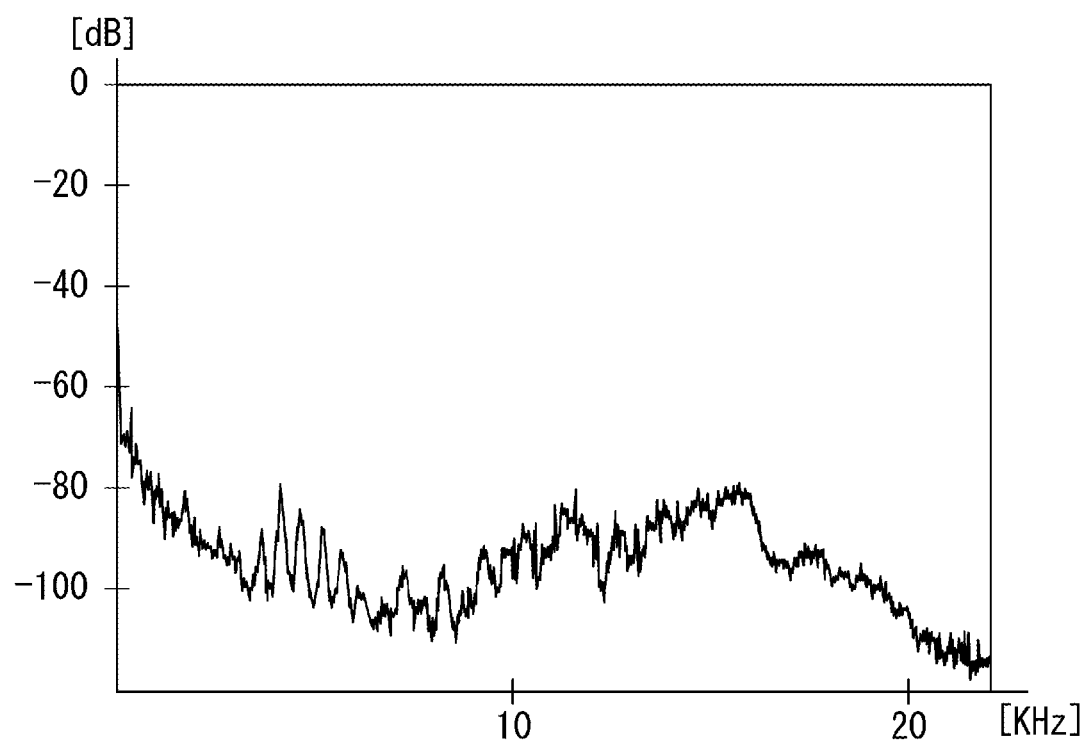

The effects of the present exemplary embodiment are described. FIGS. 4A and 4B illustrate frequency characteristics of noise generated from the isolation transformer T21 when a power source circuit operates under the condition that the period for stopping oscillation is 940 μs and the optimal period for oscillation is 2 ms. FIG. 4A illustrates frequency characteristics of noise generated from the isolation transformer T21 when the circuit operates when the period of the intermittent oscillation operation is fixed to 2 ms. FIG. 4A indicates that noise having intensity peaks at frequencies equal to a multiple of 500 Hz that is the frequency of the intermittent oscillation operation. FIG. 4B illustrates frequency characteristics when the control of change in pulse intervals is performed according to the above described present exemplary embodiment. FIG. 4B illustrates frequency characteristics of noise generated from the isolation transformer T21 in the case where the period of the intermittent oscillation operation is randomly changed around 2 ms.

In this case, one pulse interval is randomly selected from eight pulse intervals (1.99 ms, 1.98 ms, 1.97 ms, 1.96 ms, 1.95 ms, 1.94 ms, 1.93 ms, and 1.92 ms), and a pulse is output according to the selected pulse interval. This operation is repeated to generate pulse signals, which are used as drive signals of the intermittent oscillation operation. In this case, the intermittent oscillation operation has frequencies that are not unique, resulting in suppressed peaks generated at the frequencies equal to a multiple of 500 Hz.

In the present exemplary embodiment, the plurality of pulse intervals have different values from one another for the intermittent oscillation operation, but the effect can be obtained even if only two pulse intervals have different values. Specifically, in the example illustrated in FIG. 4B, for example, even if one interval is set to 1.99 ms and the other intervals are set to 2.00 ms, unpleasant noise can be reduced.

According to the present exemplary embodiment, a plurality of intervals to turn on a switching device are set at random in intermittent oscillation operation, resulting in reduction of unpleasant noise generated in the intermittent oscillation operation of a switching power source.

A second exemplary embodiment is described. In the first exemplary embodiment, every time a pulse is output by a pulse signal generation unit, a signal instructing generation of a random number is transmitted to a random number generation unit, so that the random number generated by the random number generation unit is used to determine a next pulse interval. The present exemplary embodiment differs from the first exemplary embodiment in that counter values of predetermined numbers that are output in a predetermined order are used to determine pulse intervals, instead of the random numbers. Such counter values also enable the changes in pulse intervals for every pulse, which leads to reduction of unpleasant noise to be generated, without convergence of frequencies to definite values in the intermittent oscillation operation of the switching power source. The present exemplary embodiment is described in detail.

The power source circuit of the present exemplary embodiment has a similar configuration to that of the first exemplary embodiment, except an oscillation stop signal generation circuit 103, which is described below: the same configuration between the first and second exemplary embodiments are not described.

Figure 5:
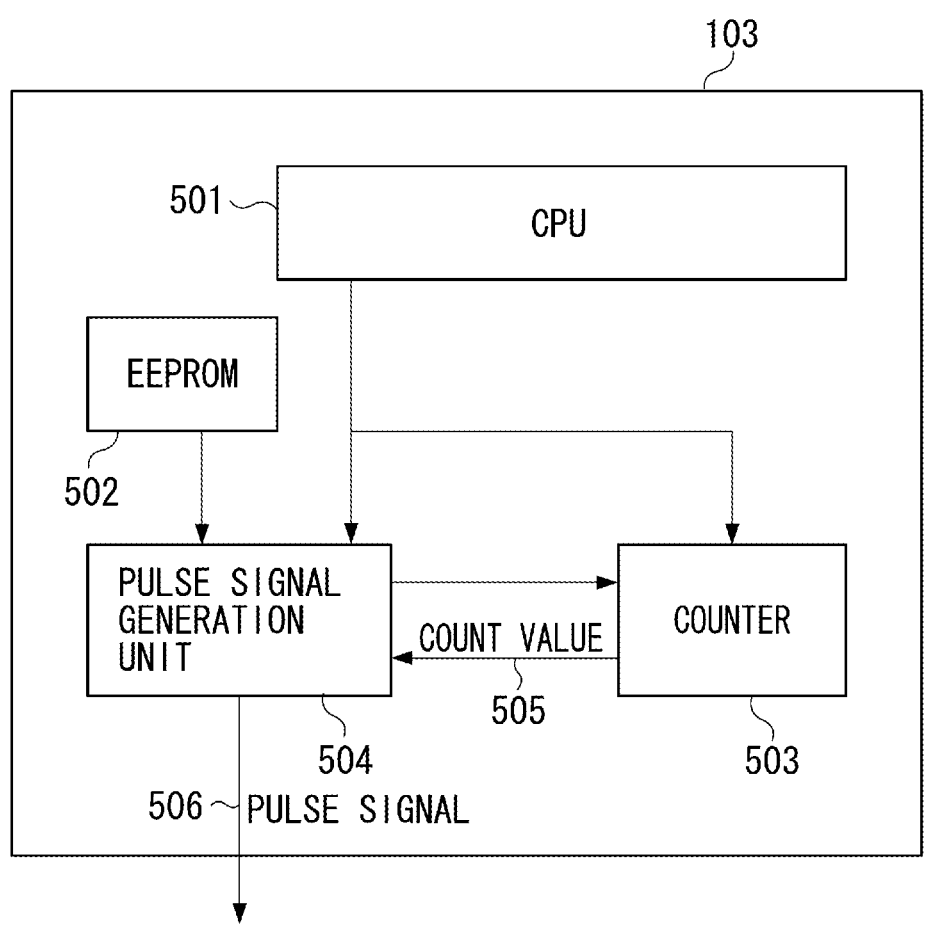
FIG. 5 illustrates a configuration of an oscillation stop signal generation unit of a switching power source according to a second exemplary embodiment.

FIG. 5 illustrates a configuration of an oscillation stop signal generation circuit 103 of the present exemplary embodiment. The oscillation stop signal generation circuit 103 includes a CPU 501, an EEPROM 502 as nonvolatile memory, a counter 503, and a pulse signal generation unit 504. These elements are described. The EEPROM 502 stores information of the period for stopping oscillation and the optimal period for oscillation as in the first exemplary embodiment. The counter 503 increments the count number of the counter by one when receiving a signal instructing counting from the pulse signal generation unit 504, and transmits the incremented count value to the pulse signal generation unit 504.

The pulse signal generation unit 504 receives information of the period for stopping oscillation and the optimal period for oscillation stored in the EEPROM 501 and the count value transmitted from the counter 503, and determines a pulse interval for every pulse. As in the first exemplary embodiment, the pulse width can be set to be in a range about 10 times as long as that of the oscillation frequency of the switching power source. The pulse interval is set by adding a count value as difference value to a reference value that is the sum of the period for stopping oscillation and the optimal period for oscillation. The difference value is added to the reference value after correcting a value to be within about 10% of the reference value. If the pulse interval is shorter than the period for stopping oscillation, the oscillation frequency cannot be controlled easily as desired in the intermittent oscillation operation. Hence, the difference value is limited so that the pulse interval is prolonged to exceed the period in which oscillation is stopped.

In the present exemplary embodiment, the correction of difference value is performed by the pulse signal generation unit 504. Alternatively, about ten different pulse intervals within the limit of the period for stopping oscillation may be generated and stored in the EEPROM 501 in advance, so that the pulse interval is output one by one in association with a count value transmitted from the counter 503. After the setting of the pulse interval, the pulse signal generation unit 504 transmits a signal to the control terminal Q23 to output one pulse, and also transmits a signal that instructs counting to the counter 503 to receive a count value. The operation is repeated every time one pulse is transmitted.

Figure 6:
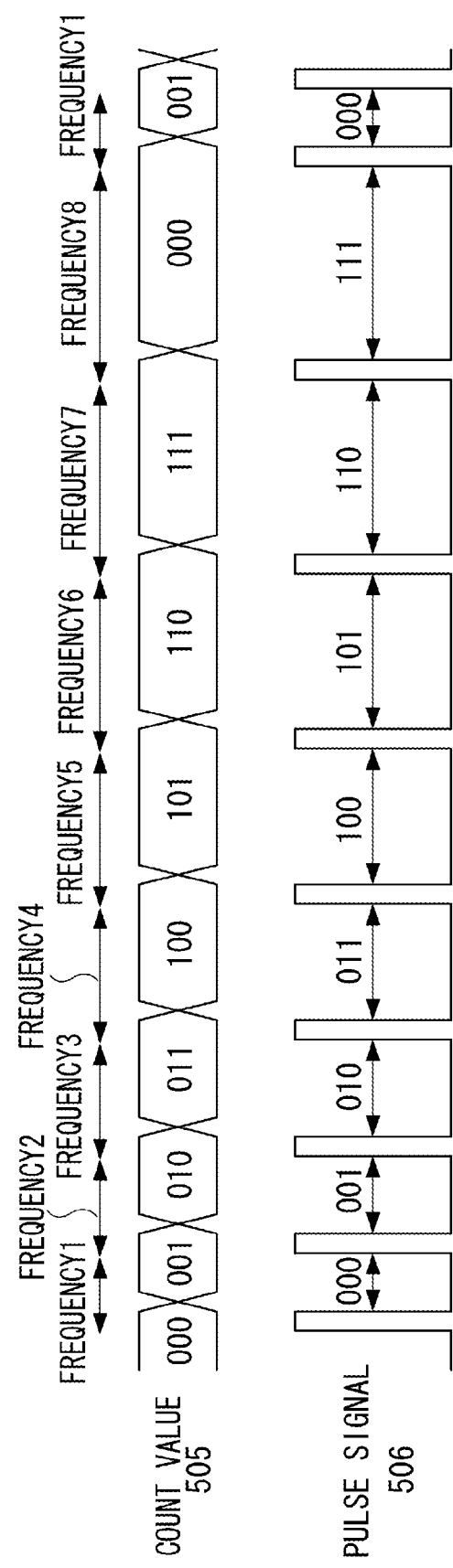
FIG. 6 illustrates the relationship between count values from an oscillation stop signal generation unit and waveforms of an oscillation stop signal according to the second exemplary embodiment.

FIG. 6 illustrates the relationship, during repetition of the above serial operations, between pulse waveforms output from the oscillation stop signal generation circuit 103 and the count values in the oscillation stop signal generation circuit 103 outputting the pulse waveforms. In the present exemplary embodiment, the counter has three bits, but the number is not limited to three bits and any number of bits can produce similar effects. The circuit determines a next pulse interval according to the generated count value, and outputs one pulse. Every time a pulse is output, a count value is updated to a next value, which is used to determine the next pulse interval. As a result, pulse intervals are changed for each pulse. In the present exemplary embodiment, pulse intervals can be determined using an up counter instead of the random number generation unit of the first exemplary embodiment, so that the present exemplary embodiment has an advantage of simpler circuit configuration.

According to the present exemplary embodiment, a plurality of intervals to turn on a switching device are set at random by the counter in intermittent oscillation operation, so that unpleasant noise generated in the intermittent oscillation operation of a switching power source can be reduced.

A third exemplary embodiment is described. In the first exemplary embodiment, every time a pulse is output by a pulse signal generation unit, a signal instructing generation of a random number is transmitted to a random number generation unit, and the random number generated by the random number generation unit is used to determine a next pulse interval. Even if every pulse interval is not changed one by one, and several intervals are the same period in succession, when the pulse intervals are dispersed from the viewpoint of longer period of time, the frequency characteristics having no noise with definite intensity peaks during intermittent oscillation operation can be obtained. Accordingly, the present exemplary embodiment features an approach that uses a pulse array for intermittent oscillation operation of a switching power source to prevent generation of unpleasant noise from a transformer, while the pulse array outputs pulses at (the) equal intervals in short term, but at random intervals in a long period of time. The present exemplary embodiment is described in detail.

The power source circuit of the present exemplary embodiment has a similar configuration to that of the first exemplary embodiment, except an oscillation stop signal generation circuit 103, which is described below: the same configuration between the first and second exemplary embodiments are not described.

Figure 7:
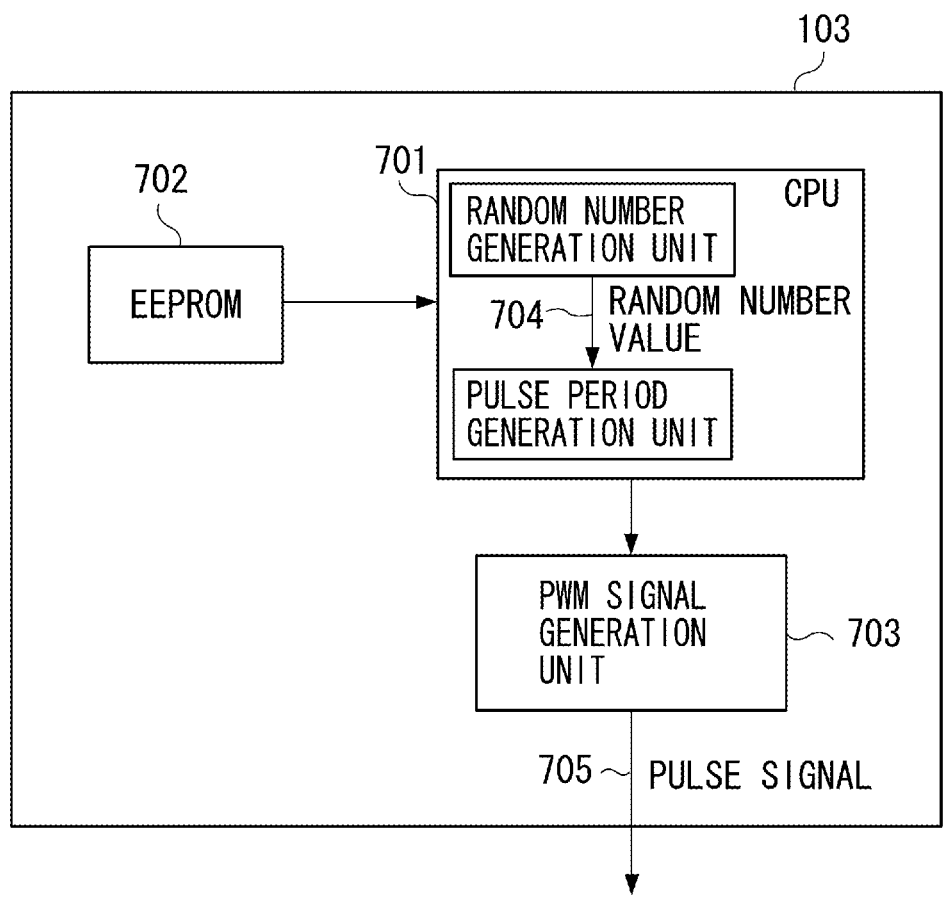
FIG. 7 illustrates a configuration of an oscillation stop signal generation unit of a switching power source according to a third exemplary embodiment.

FIG. 7 illustrates a configuration of an oscillation stop signal generation circuit 103 of the present exemplary embodiment. The oscillation stop signal generation circuit 103 includes a CPU 701, an EEPROM 702, and a PWM signal generation unit 703. The CPU 701 functions as a random number generation unit configured to generate random numbers according to a program code incorporated therein. The CPU 701 also receives information of the period for stopping oscillation and the optimal period for oscillation stored in the EEROM 702, and determines pulse widths and pulse intervals using generated random numbers. The pulse width is set to be in a range about 10 times as long as that of the oscillation frequency of the switching power source. The pulse interval is set by adding a count value as difference value to a reference value that is the sum of the period for stopping oscillation and the optimal period appropriate for oscillation. The difference value is added to the reference value after correcting a value to be within about 10% of the reference value. If the pulse interval is shorter than the period for stopping oscillation, the oscillation frequency cannot be controlled easily as desired in the intermittent oscillation operation. Hence, the difference value is limited so that the pulse interval is prolonged to exceed the period in which oscillation is stopped. The PWM signal generation unit 703 receives the values of the pulse width and pulse interval from the CPU 701, and outputs pulse specified by the values.

Figure 8:
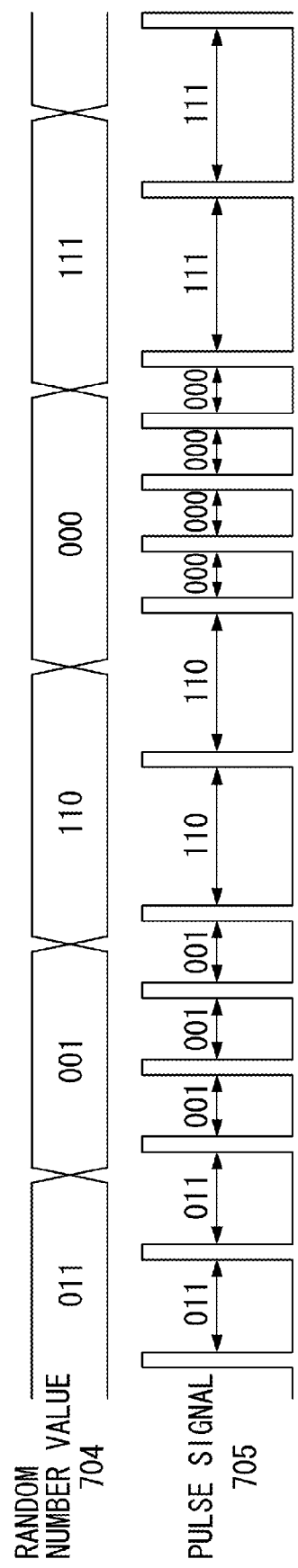
FIG. 8 illustrates the relationship between random values from an oscillation stop signal generation unit and waveforms of an oscillation stop signal according to the third exemplary embodiment.
Figure 9:
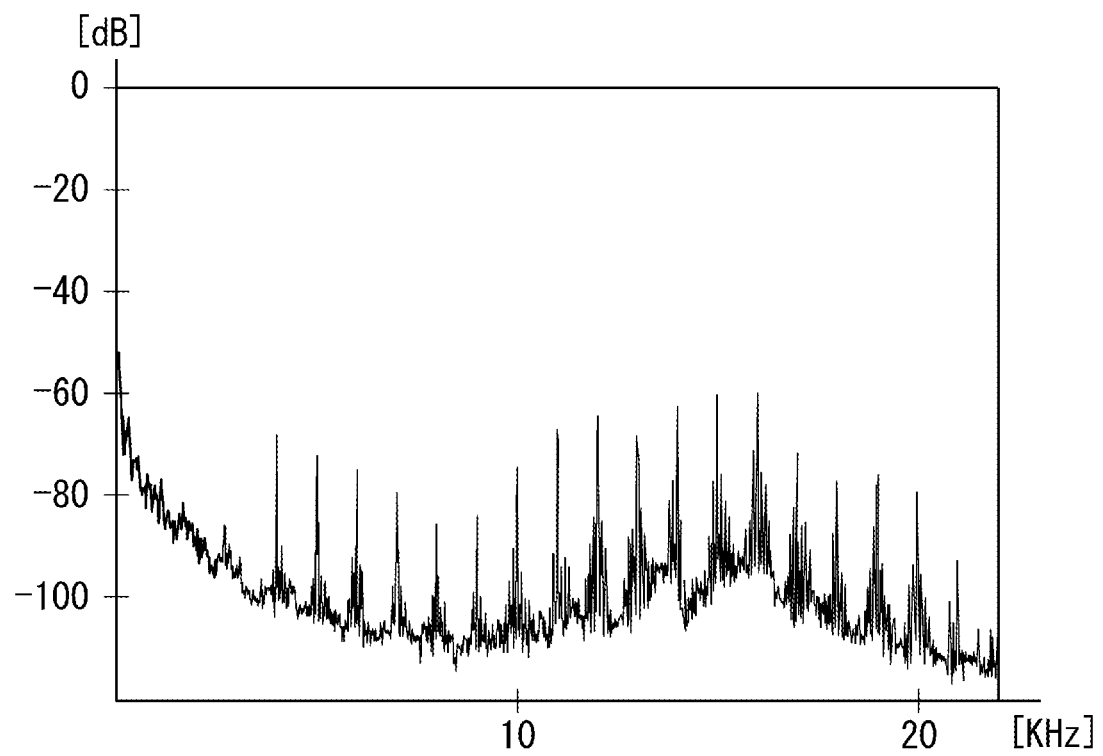
FIG. 9 illustrates frequency characteristics of noise generated by a conventional isolation transformer.

FIG. 8 illustrates the relationship, during repetition of the above serial operations, between pulse waveforms output from the oscillation stop signal generation circuit 103 and the random values in the oscillation stop signal generation circuit 103 outputting the pulse waveforms. The circuit continues to output pulses at a pulse interval determined by a random value currently set, until the random value is updated to a next random value. When the CPU 701 calculates a next random value and switches to the setting of new random value, the pulse interval is changed when a first pulse is output after the setting of the new value. As a result, a pulse interval is changed after a predetermined number of pulses having an equal interval are output. In the present exemplary embodiment, as illustrated in FIG. 8, pulses are controlled such that a first three pulses are output with the same two intervals, a second four pulses are output with the same three intervals (different from the previous pulse interval), and then a third three pulses are output with the same two intervals (different from the previous pulse interval). In the present exemplary embodiment, pulse intervals are not changed for each pulse and can be switched easily, so that the present exemplary embodiment has an advantage of simpler circuit configuration than that in the first exemplary embodiment.

As described above, according to the present exemplary embodiment, the simple manner to control pulse intervals is used, in which a predetermined number of equal pulse intervals are serially used, so that unpleasant noise generated in a switching power source during its intermittent oscillation operation can be reduced.

An example to which a switching power source of the present invention is applied is described. The present invention is applicable to a low-voltage power supply for image forming apparatus such as printer, copying machine, and facsimile. The present invention can be used to supply power to a controller serving as a control unit in an image forming apparatus, and can be used as a power source to a motor serving as a drive unit of a conveyance roller that conveys sheets.

Figure 10A:
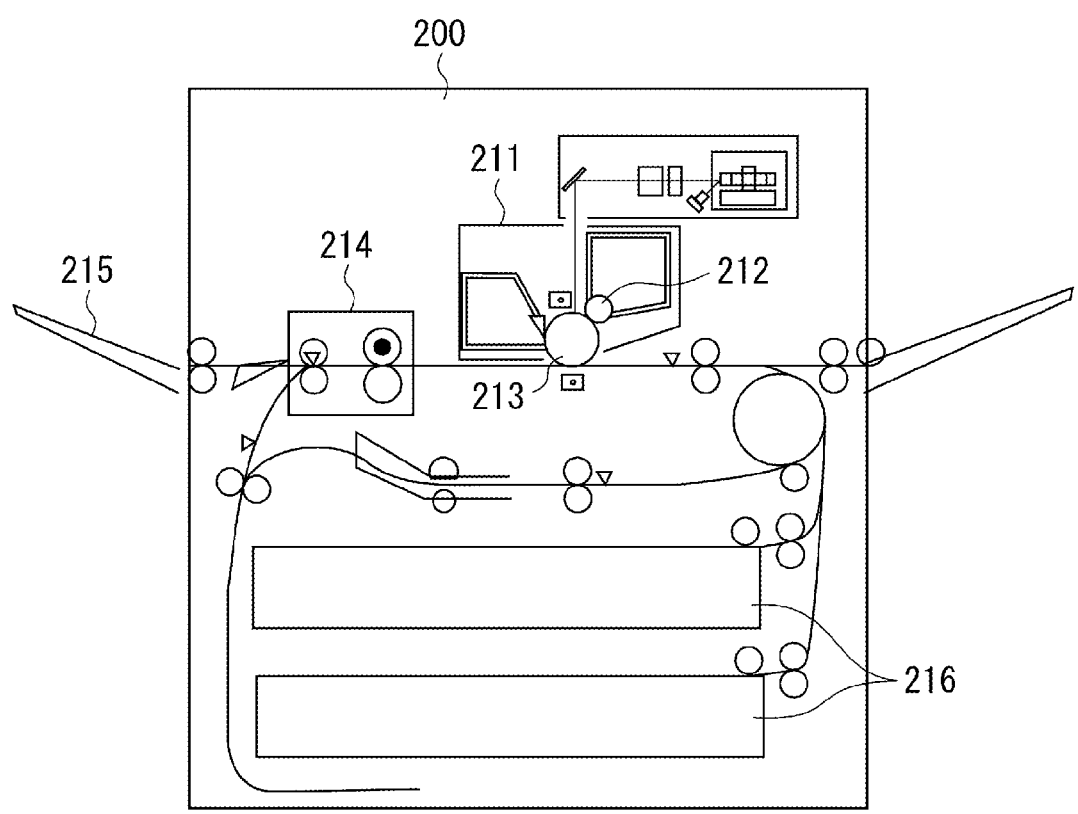
FIGS. 10A and 10B illustrate an example having a switching power source according to the present invention.
Figure 10B:
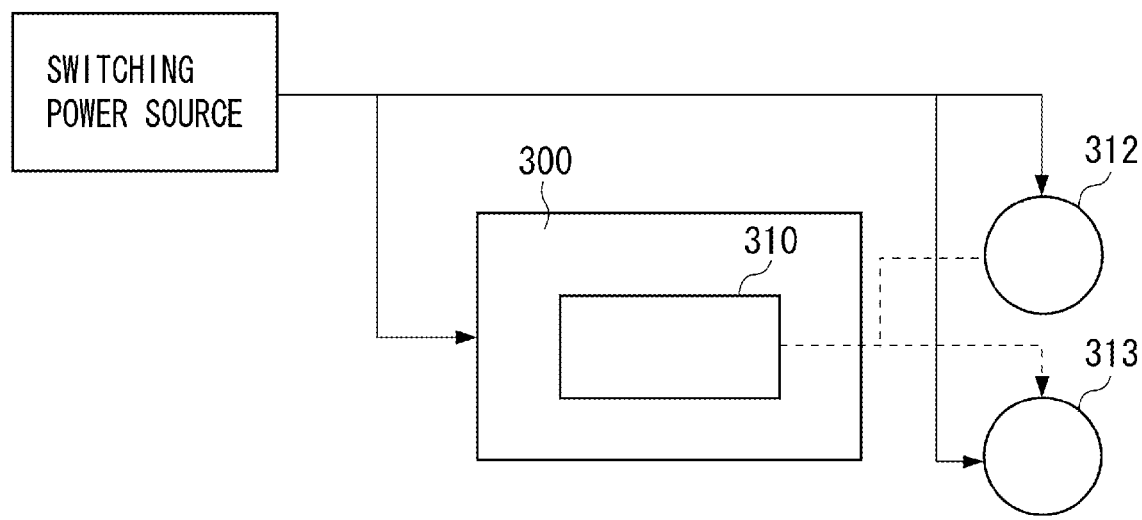

FIG. 10A schematically illustrates a structure of a laser beam printer as an image forming apparatus. A laser beam printer 200 includes an image formation unit 211 having a photosensitive drum 213 serving as an image bearing member on which latent images are formed, and a development unit 212 configured to develop the latent images on the photosensitive drum 213 using toner. The developed toner images on the photosensitive drum 213 are transferred to sheets (not illustrated) that are recording media supplied from a cassette 216. The toner images on the sheets are fixed by a fixing unit 214, and the sheets are discharged to a tray 215. FIG. 10B illustrates a controller as a control unit of an image forming apparatus and a power supply line from a power source to a motor serving as a drive unit. The switching power source can be used to supply power to a controller 300 having a CPU 310 to control image forming operation by the image forming apparatus, and to supply power, as a low-voltage power source, to motors 312 and 313 serving as a drive unit for image formation. The switching power source can supply power of 3.3 V to the controller 300, and power of 24 V to the motors, for example.

For example, the motor 312 drives a conveyance roller that conveys sheets, and the motor 313 drives a fixing unit 214. While the image forming apparatus is not operated (does not form images), when the image forming apparatus enters power saving mode upon receipt of an instruction from the controller, the switching power source decreases output voltages, and enters a light load state. Hence, the switching power source shifts to the mode of the above-described switching operation to reduce its beat sound, enabling reduction in noise of the image forming apparatus. Such control of switching operation described in the above exemplary embodiment can be applied as a low-voltage power supply not only to the image forming apparatus described above but also to another electronic apparatuses.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-141937 filed Jun. 22, 2010, which is hereby incorporated by reference herein in its entirety.

What is claimed is:

1. A switching power source comprising:
a transformer;
a switching element configured to perform switching a primary side of the transformer; and
an output unit configured to output a voltage generated at a secondary side of the transformer,
wherein the output unit outputs a first voltage in a first state that the switching element perform switching continuously, and outputs a second voltage that is lower than the first voltage in a second state that the switching element perform switching intermittently,
wherein a switching cycle of the switching element is set to be a first switching cycle at the first state, and the switching cycle of the switching element is set to be a second switching cycle that is longer than the first switching cycle at the second state, and
a control unit configured to control a timing to turn on the switching element,
wherein, at the second state, the control unit turns on the switching element at least three times,
wherein, by setting a period for the switching element to be turned on as a first period, the period is lengthened with every time the switching element is turned on, and
wherein in a case where the period becomes a predetermined period, the period is set back to the first period.

2. The switching power source according to claim 1, further comprising
a signal transfer unit configured to transfer a signal corresponding to a voltage output from the output unit to the primary side of the transformer; and an error detection unit configured to output a voltage to the signal transfer unit, the voltage corresponding to a difference between the voltage output from the output unit and a reference voltage, wherein, when the output unit outputs the second voltage the error detection unit adds, to the voltage to be output therefrom, a signal to control the switching cycles.

3. The switching power source according to claim 1, further comprising:

a counter configured to set the period, wherein, according to the period set by the counter, the control unit lengthen the period every time the switching element is turned on.

4. An image forming apparatus comprising:

an image formation unit configured to form images;

a control unit configured to control operations of the image formation unit;

a switching power source configured to supply power to the control unit, wherein the switching power source includes a transformer, a switching unit configured to perform switching of a voltage supplied to a primary side of the transformer, and an output unit configured to output a voltage generated at a secondary side of the transformer;

wherein the output unit outputs a first voltage in a first state that the switching element perform switching continuously, and outputs a second voltage that is lower than the first voltage in a second state that the switching element perform switching intermittently, wherein a switching cycle of the switching element is set to be a first switching cycle at the first state, and the switching cycle of the switching element is set to be a second switching cycle that is longer than the first switching cycle at the second state; and a control unit configured to control a timing to turn on the switching element, wherein, at the second state, the control unit turns on the switching element at least three times, wherein, by setting a period for the switching element to be turned on as a first period, the period is lengthened with every time the switching element is turned on, and wherein in a case where the period becomes a predetermined period, the period is set back to the first period.

5. The image forming apparatus according to claim 4, further comprising:

a signal transfer unit configured to transfer a signal corresponding to a voltage output from the output unit to the primary side of the transformer; and an error detection unit configured to output a voltage to the signal transfer unit, the voltage corresponding to a difference between the voltage output from the output unit and a reference voltage, wherein, when the output unit outputs the second voltage, the error detection unit adds, to the voltage to be output therefrom, a signal to control the switching cycles.

6. The image forming apparatus according to claim 4, further comprising:

a counter configured to set the period, wherein, according to the period set by the counter, the control unit for controlling the switching lengthen the period every time the switching element is turned on.

7. The image forming apparatus according to claim 4, wherein a voltage output from the output unit of the switching power source is supplied to a drive unit configured to drive the image formation unit.

8. The image forming apparatus according to claim 4, wherein the control unit is configured to output, to the switching power source, a signal to cause the switching power source to switch from the first voltage to the second voltage when the image forming apparatus is in a power saving mode when the image forming apparatus is not operated.

* * * * *